United States Patent [19]
Lee et al.

[11] Patent Number: 6,003,014
[45] Date of Patent: Dec. 14, 1999

[54] METHOD AND APPARATUS FOR ACQUIRING ACCESS USING A SMART CARD

[75] Inventors: Alson A Lee, Orinda; Jerry Sloan; Irv H. Wentzein, both of Saratoga, all of Calif.

[73] Assignee: Visa International Service Association, Foster City, Calif.

[21] Appl. No.: 08/918,559

[22] Filed: Aug. 22, 1997

[51] Int. Cl.$^6$ .................................................. G06K 19/07
[52] U.S. Cl. ............................... 705/13; 705/41; 705/44; 705/65; 713/182; 713/184
[58] Field of Search .................... 705/13, 39, 41, 705/44, 65; 713/182, 184

[56] References Cited

U.S. PATENT DOCUMENTS

| | | |
|---|---|---|
| 4,007,355 | 2/1977 | Moreno . |
| 4,616,128 | 10/1986 | Case . |
| 4,877,179 | 10/1989 | Baker et al. . |
| 4,891,503 | 1/1990 | Jewell . |
| 5,191,195 | 3/1993 | Aubrey . |
| 5,287,269 | 2/1994 | Dorrough et al. . |
| 5,298,726 | 3/1994 | Aubrey . |
| 5,574,441 | 11/1996 | Roes et al. . |
| 5,706,349 | 1/1998 | Aditham et al. ........................ 380/25 |
| 5,714,741 | 2/1998 | Pieterse et al. ....................... 235/380 |
| 5,721,781 | 2/1998 | Deo et al. ............................... 380/25 |
| 5,907,142 | 5/1999 | Kelsey .................................. 235/380 |
| 6,612,684 | 3/1997 | Kelly et al. . |

FOREIGN PATENT DOCUMENTS

| | | |
|---|---|---|
| 780801 | 6/1997 | European Pat. Off. . |
| WO 93/02430 | 2/1993 | United Kingdom . |
| WO 95/22125 | 8/1995 | WIPO . |

OTHER PUBLICATIONS

Contactless cards; the coming wave?; Rottemburg, Philippe; Mass Transit; Jul. 17, 1997; No. 4, vol. 23; p. 41.

The very smart card; a plastic pocket bank; Shogase, Hiro; IEEE Spectrum, Oct. 1994, pp. 35–39.

E–Money (That's What I Want); Levy, Steven; Wired Magazine; Dec. 1994; pp. 174–179 and 213–219.

Smart Cards; Fancher, Carol H.; Scientific American; Aug. 1996; pp. 1–10.

Identification card system—Inter–sector electronic purse, Part 1: Concepts and structures; European Prestandard; Draft, prEN 1546–1; Oct. 12, 1994.

Identification card system—Inter–sector electronic purse, Part 2: Security architecture; European Prestandard; Draft, prEN xxxxx–2; Jan. 18, 1994.

(List continued on next page.)

*Primary Examiner*—Allen R. MacDonald
*Assistant Examiner*—Susanna Meinecke-Diaz
*Attorney, Agent, or Firm*—Beyer & Weaver, LLP

[57] ABSTRACT

A method for using a smart card to gain access through an access device upon payment of a value (V) is performed by first operatively coupling the card to the access device. The access device reads a first and a second set of data from the card, and performs a first authentication process on the first set of data. Access is permitted if the first authentication process meets a required condition. Access is denied otherwise. If access is permitted, the second set of data is stored in the access device for further processing, including a second authentication process which operates on the first and second sets of data.

20 Claims, 6 Drawing Sheets

OTHER PUBLICATIONS

Identification card system—Inter–sector electronic purse, Part 3: Data elemetns and interchanges; European jPrestandard; Draft, prEN 1546–3; Dec. 9, 1994.

Identification card system—Inter–sector electronic purse, Part 4: Devices; European Prestandard; Draft, prEN 1546–4; Oct. 11, 1994.

Identification cards—Integrated circuit(s) cards with contacts—Part 1: Physical characteristics; International Standard: ISO 7816–1:1987(E).

Identification cards—Integrated circuit(s) cards with contacts—Part 2 Dimensions and location of the contacts; International Standard: ISO 7816–2:1988(E).

Identification cards—Integrated circuit(s) cards with contacts—Part 3: Electronic signals and transmission protocols; International Standard: ISO 7816–3:1989(E).

Identification cards—Integrated circuit(s) cards with contact—Part 4: Inter–industry commands for interchange; International Standard: ISO 7816–4:1994(E).

Identification cards—Integrated circuit(s) cards with contacts—Part 5: Numbering system and registration procedure for application identifiers; International Standard: ISO 7816–5:1992(E).

ID Cards—IC Cards With Contacts (PaA6).

Identification cards—Contactless integrated circuit(s) cards—Part 1: Physical characteristics; International Standard; ISO/IEC 10536–1:1992(E).

Identification cards—Contactless integrated circuit(s) cards—Part 2: Dimensions and location of coupling areas; International Standard; ISO/IEC 10536–2:1995(E).

Identification cards—Contactless integrated circuit(s) cards—Part 3: Electronic signals and reset procedures; International Standard; ISO/IEC 10536–3:1996(E).

METHOD AND APPARATUS FOR ACQUIRING ACCESS USING A SMART CARD

BACKGROUND OF THE INVENTION

The present invention relates generally to payment systems. More particularly, embodiments of the invention relate to payment systems using smart cards.

Portable transaction cards with processing power, or so-called "smart cards" are being developed in the size of conventional plastic credit cards. These smart cards can include an embedded computer chip having processing power and memory. Variants of these cards were described in the early 1970s by, for example, Moreno in U.S. Pat. No. 4,007,355. However, the cards are only recently becoming widely available for payment applications around the world.

The International Standards Organization (ISO) has established a number of specifications for such electronic cards under the ISO/IEC Standards Series 7810, 7811, 7816, and 10536. A typical smart card includes a plurality of spaced apart electrical contacts on one surface which provide input and output interfaces with the computer processor and memory in the card. Cards compliant with ISO/IEC Standard 7816-series have contacts which interface with a terminal via ohmic contact ("contact" cards). Cards compliant with, e.g., ISO/IEC Standard 10536-series rely on close-coupling with a terminal ("contactless" cards). Some smart cards are now being produced with both types of contact schemes, i.e., they are compatible with terminals having contact interfaces or contactless interfaces. These types of cards are sometimes referred to as combination cards. A block diagram of a smart card 12 is shown in FIG. 1.

Smart card 12 can be implemented as a processor card as illustrated in FIG. 1. Of course, smart card 12 can be implemented in a variety of different ways, and the card of FIG. 1 is intended to illustrate one existing version of card that may be used with the present invention. Smart card 12 has an embedded microcontroller with a microprocessor 14, card memory including random access memory (RAM) 16, read-only memory (ROM) 18, non-volatile memory 20, an encryption module 24, a card reader interface 22, and first and second contact structures 26, 28. Other features of the microcontroller may be present but are not shown, such as a clock, a random number generator, interrupt control, control logic, a charge pump, power connections, and the like.

Microprocessor 14 is any suitable central processing unit for executing commands and controlling the device. RAM 16 serves as storage for calculated results and as a stack memory. ROM 18 stores the operating system, fixed data, standard routines, and look-up tables. Non-volatile memory 20 (such as EPROM or EEPROM) serves to store information that must not be lost when the card is connected to a power source but that must also be alterable to accommodate data specific to individual cards or any changes possible over the card lifetime. This information might include a card identification number, a personal identification number, authorization levels, cash balances, credit limits, etc. Encryption module 24 is an optional hardware module used for performing a variety of encryption algorithms. Card reader interface 22 includes the software and hardware necessary for communication with the outside world. In the smart card shown, two different contact structures are provided on the card, a first contact structure 26 which may be e.g., a ISO/IEC Std. 7816-series style contact, and a second contact structure 28 which may be, e.g., an ISO/IEC Std. 10536-series style contactless or close-coupled interface. Other types of contact schemes may also be possible, including remote-coupled, etc.

One application for smart cards such as smart card 12 of FIG. 1, is as an electronic purse or "stored value card". In this type of application, a prepaid amount of value or representation of currency is stored in the smart card memory for use in the place of conventional cash. The source of the value stored in a card may be, for example, a bank account, a credit card, a debit card, another electronic card, currency, or other sources of funds. In operation, the stored value card is inserted into a terminal device which communicates with the card through the contacts (via ohmic or close-coupling, depending upon the type of interface supported).

The terminal device may be, e.g., incorporated into a vending machine, cash register, or other point-of-sale device. Value equal to the amount of the purchase is passed from the consumer's card to the merchant terminal or to a central clearing and authorization system so the merchant or vendor may be credited with the appropriate amount of value. Correspondingly, the amount of available currency in the consumer's card is reduced by the amount of the purchase. These stored value applications are becoming more widely used in the U.S. and throughout the world. Currently, the primary applications in which stored value cards are used include purchases at vending machines, telephones, gasoline pumps, and other point of sale devices in which the goods or services purchased are low dollar value items.

Stored value card systems are operated as both "open" or "closed" systems. "Closed" systems are limited to specific participating merchants. For example, some universities offer stored value cards to their students for use in university cafeterias and book stores. The cards are not compatible with point of sale devices or terminals outside the university. These "closed" systems are easier to implement from a technical and security perspective because of this closed universe of uses. "Open" systems, on the other hand, allow use of the card at substantially any merchant who has a compatible point of sale device or card reader. An example of such a system is the Visa Cash® system offered by Visa International Service Association of San Francisco Calif. In many respects, "open" stored value card systems are preferable to "closed" systems, as they allow the cards to be used in a wide variety of places, for various types of purchases. "Open" systems, however, are more difficult to implement and have more rigorous security requirements.

As these stored value card systems become more widely available, it is desirable that they be capable of use in more payment applications. For example, a solution for using stored value cards in making payments over open networks such as the internet is described in commonly-assigned U.S. patent application Ser. No. 08/951,614, entitled "Internet Payment System Using Smart Cards", filed on Oct. 16, 1997, which is incorporated herein by reference for all purposes.

It would also be desirable to use smart cards in transit or access applications, such as toll booths, parking meters, etc. Public transit systems are widely used in most large communities. These systems are relied upon to efficiently transport large numbers of people. To transport large numbers of people, especially at peak traffic times, it is necessary that passengers be able to enter and exit the transit system quickly in an even flow. Existing transit systems use a variety of payment and authorization methods to make sure passengers can quickly board and disembark. For example, many buses, subways, and trains allow passengers to use currency, tokens or passes to pay for their ride. The objective is to verify a passenger has paid or has a valid pass as quickly as possible to ensure the greatest possible throughput, especially at peak use times. Turnstiles and other access devices are used to permit or deny access depending upon proper verification of a rider's payment.

It would be desirable to permit transit passengers to gain access to transportation using smart cards. Further, it is desirable to implement such an access system using an "open" stored value card system (i.e., a system which is not limited to a closed universe of merchants or suppliers).

Unfortunately, however, existing smart cards and "open" stored value card systems are too slow for acceptable use in most transit systems. The security and authentication processes needed to verify a transaction using existing systems typically takes over 1.0 to 2.0 seconds. This is too long of a wait for, e.g., transit riders trying to gain entry to a transit system at rush hour. It would be desirable to implement an "open" stored value system with a quicker access and authorization time, without compromising the ability to perform full authentication and verification of cards.

Accordingly, a system and method for fast smart card transactions is described.

SUMMARY OF THE INVENTION

Embodiments of the present invention provide a smart card system suited for applications where cardholders demand a very fast transaction approval and response time and where large numbers of transactions are presented for authorization. In one specific embodiment, a cardholder presents a smart card to an interface device coupled to an access device. First and second sets of information are read from the card. The access device performs a first, or low-level authentication of the card using first data read from the card. If the first authentication is successful, access is granted.

A subsequent, or second authentication process may then be performed in the background between the access device and a terminal device. The second authentication process can be performed in a batch on a predetermined time schedule. The first authentication process may include verifying the card has sufficient funds available to make the requested access, or may simply verify the card has not yet expired. The second authentication process includes steps to authenticate that the card was validly issued and that a valid card was involved. The second authentication process, in a currently-preferred embodiment, includes performing public key encryption.

In one embodiment of the present invention, the access device is a turnstile such as, for example, an admission turnstile at a light rail station, etc. The terminal device may be a terminal located near the access device, and may be configured to service a number of access devices on a regular basis.

The result is an access system suited for applications where a large number of cardholders need quick authorization response times. Embodiments of the invention can be used in applications requiring access times of less than about 0.25 to 0.50 seconds. From the cardholder's perspective, systems implemented according to the invention process and approve the transaction almost instantly. Systems implemented using features of the invention allow the use of "open" stored value card system applications in transit or access applications, giving cardholders the ability to use a single card for purchases at point of sale devices and transit applications.

A further understanding of the nature and advantages of the invention may be realized by reference to the remaining portions of the specification and the drawings.

DESCRIPTION OF SPECIFIC EMBODIMENT(S)

Figure 1:
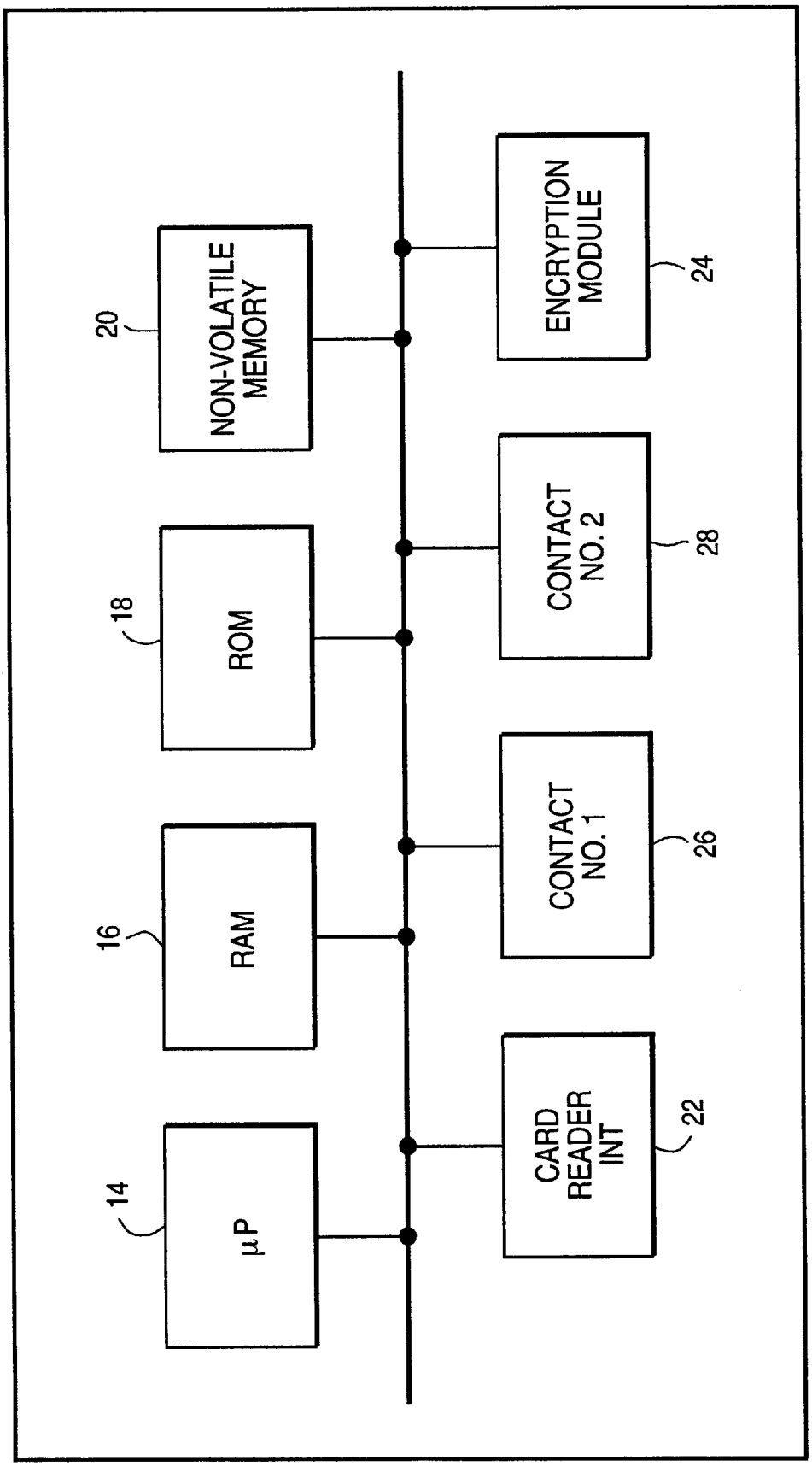
FIG. 1 is a block diagram of a smart card.

Embodiments of the present invention permit existing stored value card applications to be used in environments, such as transit or access control, which require fast authorization response times.

Embodiments of the present invention will now be described by referring first to FIG. 2, where a specific implementation of a stored value card system 10 is shown. Stored value card system 10 includes a consumer card 12, an interface device 30, an access device 40, a terminal 60, a concentration point 80, and a clearing, authorization, and settlement system 90.

Consumer card 12 is a smart card such as the card shown in FIG. 1. For the purposes of describing embodiments of the invention, consumer card 12 has at least a stored value application program 13 stored in card memory, e.g., in ROM 18. Additionally, consumer card 12 may have a transit application program 15 stored in memory which, although a separate application, may run in conjunction with stored value application program 13. Other application programs may also be stored in memory of consumer card 12, such as credit/debit applications, loyalty programs, health card information programs, licensing programs, or the like. For the purposes of describing the invention, consumer card 12, access device 40 and terminal 60 will be described as passing commands in a "command-response" format, as set forth in, e.g., "EMV '96 Integrated Circuit Card Specification for Payment Systems", Version 3.0, Jun. 30, 1996, published jointly by Europay, MasterCard, and Visa International Services Association, and incorporated herein by reference. For each command generated by, e.g., access device 40, a response from, e.g., card 12 is expected in a certain format. Those skilled in the art will recognize that other protocols may be used to implement features of the invention.

Interface device 30 operatively couples consumer card 12 with access device 40. Interface device 30, in a presently preferred embodiment, is a contactless interface device which is designed to transmit close-coupled power and data signals between consumer card 12 and access device 40.

Access device 40 includes a router 42, card handler 44, access device application hardware and software 46, terminal interface application 48, and buffer 50. Router 42 is hardware and software adapted to route information between functional blocks. Card handler 44, which may be integrally designed with interface device 30, provides functionality to accept and communicate with consumer card 12. For example, card handler 44 may include routines to control interface device 30 to perform initial power-on and detection of a card, such as in accordance with the protocol set forth in the ISO/IEC 10536 standards. Terminal interface application 48 forwards batch transaction information from access device 40 as well as receives software updates and commands from terminal 60. Buffer 50 stores batch information regarding transactions made at access device 40. Access device hardware and software 46 includes functionality to perform low-level authentication of consumer card 12 as well as functionality to permit, e.g., access where a successful low-level authentication occurs. In one specific embodiment, access device 40 is a transit access gate, and access device hardware and software 46 includes hardware and software to permit cardholder access through a turnstile if the transaction is authenticated. In other embodiments, access device 40 may be a toll booth gate, parking meter, vending machine, video game machine, controlled entry facility door, or other applications where it is desirable to quickly authorize stored value transactions.

Terminal 60 includes a router 70, access device interface 72, security card handler 62, security card 64, data store 66, terminal application hardware and software 68, and concentration point handler 74. Router 70 is hardware and software adapted to route information between functional blocks. In conjunction with security card handler 62, security card 64 controls the command sequence of the terminal and provides transaction and batch security. Security card 64 may be a small form-factor card with a single-chip processor thereon, and is used to authenticate and validate each transaction. Because the security card may contain secret information, such as private encryption keys as will be discussed below, it is desirable that security card 64 be physically secured and controlled within terminal 60. Security card 64 may contain a transaction identifier for each transaction (such as a counter incremented for each transaction), a session key, and master keys.

Access device application 72 receives batch transaction information from access device 40 and forwards software updates and commands to access device 40. Terminal application hardware and software 68 includes functionality to control terminal actions.

Data store 66 controls the storage of purchase transactions and totals. Concentration point handler 74 controls the sending and receiving of information to and from a concentration point 80. Concentration point 80 is a staging computer that communicates with any number of terminals 60 to collect batches of transactions. For example, concentration point 80 may sequentially make contact with a number of terminals 60 at prearranged times on a daily basis to collect batches of transactions stored in the data stores of each terminal. Further, after concentration point 80 has collected the batch information from each terminal, concentration point 80 may forward update information to each terminal, such as: acknowledgment information acknowledging receipt of the batch information; date changes for the terminal and access device; encryption key updates and changes; and bad card lists for the terminal and access device.

In one embodiment, concentration point 80 acts as a store and forward device and does not alter or validate the data it receives. The concentration point sends the collected transaction batches to a clearing, authorization and settlement system 90 for processing. Once processed, batch acknowledgments, along with other system updates, are sent to terminal 60 via the concentration point 80. The concentration point ensures a safe transfer of data between terminals and the clearing, authorization and settlement system 90, and prevents overloading of the system. A service provider, such as the party running the transit access terminals, contracts with a concentration point for collection of the transit payments. The concentration point may also be an existing central facility such as a central office of, e.g., a transit company which collects payments from all of the access devices operated by the company. Systems implemented according to the invention need not have concentration points, they may instead be implemented by having the terminal devices connect directly to clearing, authorization, and settlement system 90.

Software functionality in consumer card 12, access device 40, terminal 60 and concentration point 80 may be implemented using a wide range of programming languages known in the art. For example, terminal interface application 48, or any of the other software modules, may be implemented using "C", "C++" Java or similar code. It is contemplated that Java code will work well for implementing the functionality described herein, as Java is platform independent, allowing the functionality to be used on a variety of device types.

Figure 2:
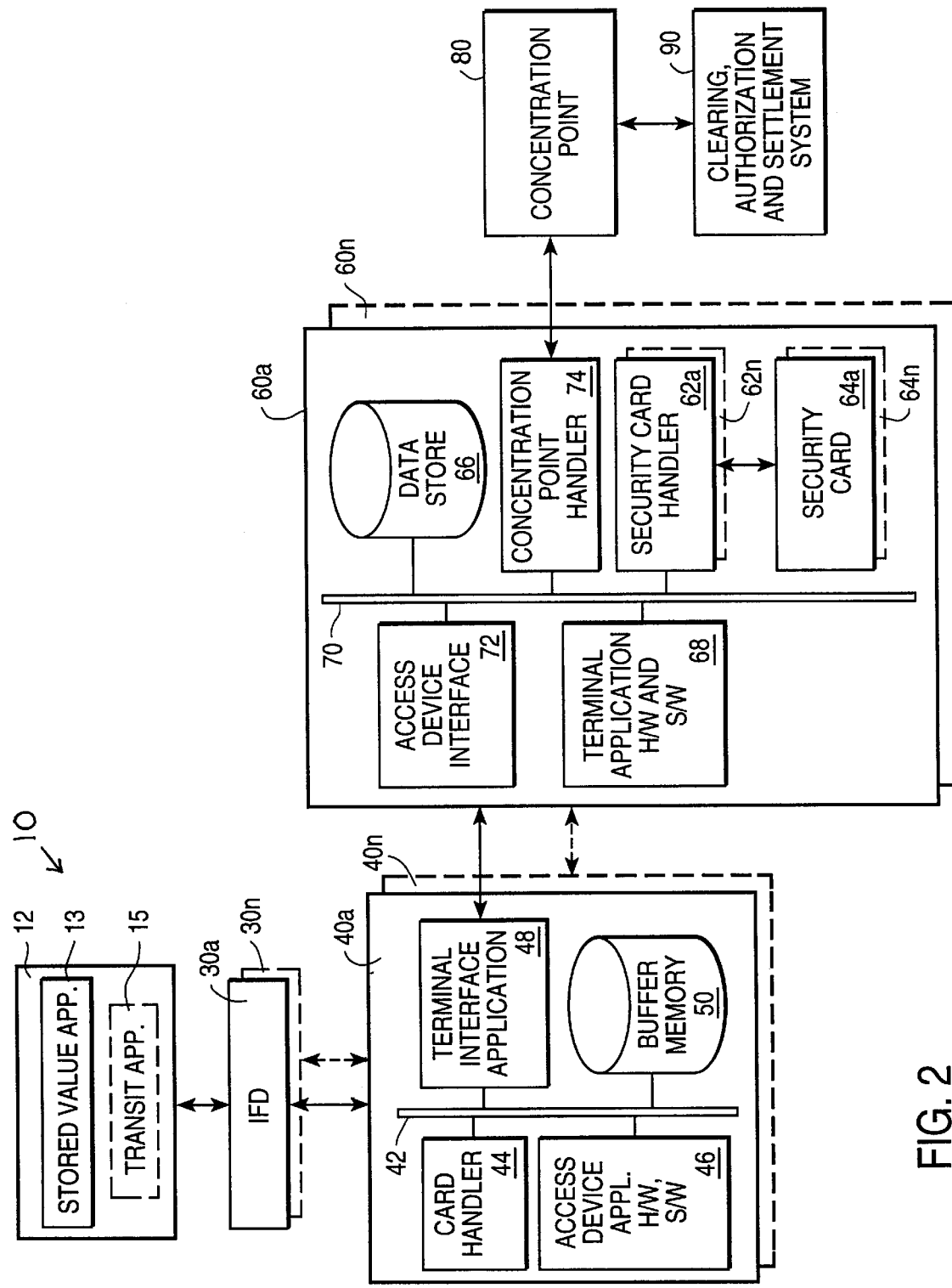
FIG. 2 is a block diagram of a smart card system incorporating features of an embodiment of the present invention.

In an alternative embodiment depicted in FIG. 2, a number of interface devices 30a–30n are provided with a number of access devices 40a–40n. These interface devices and access devices may be grouped to operate in conjunction with a single terminal 60 by providing a number of security cards 64a–64n and security card handlers 62a–62n in terminal 60. Each security card and handler will operate to interact with each access device. Further, a number of terminals 60a–60n may also be provided to work with a number of different groups of access devices. The result is an ability to support a number of devices with a relatively small number of terminals. A number of terminals 60a–60n may be coupled to each concentration point 80. Other configurations and groupings of devices may also be used, as will now be apparent to those skilled in the art.

Figure 3:
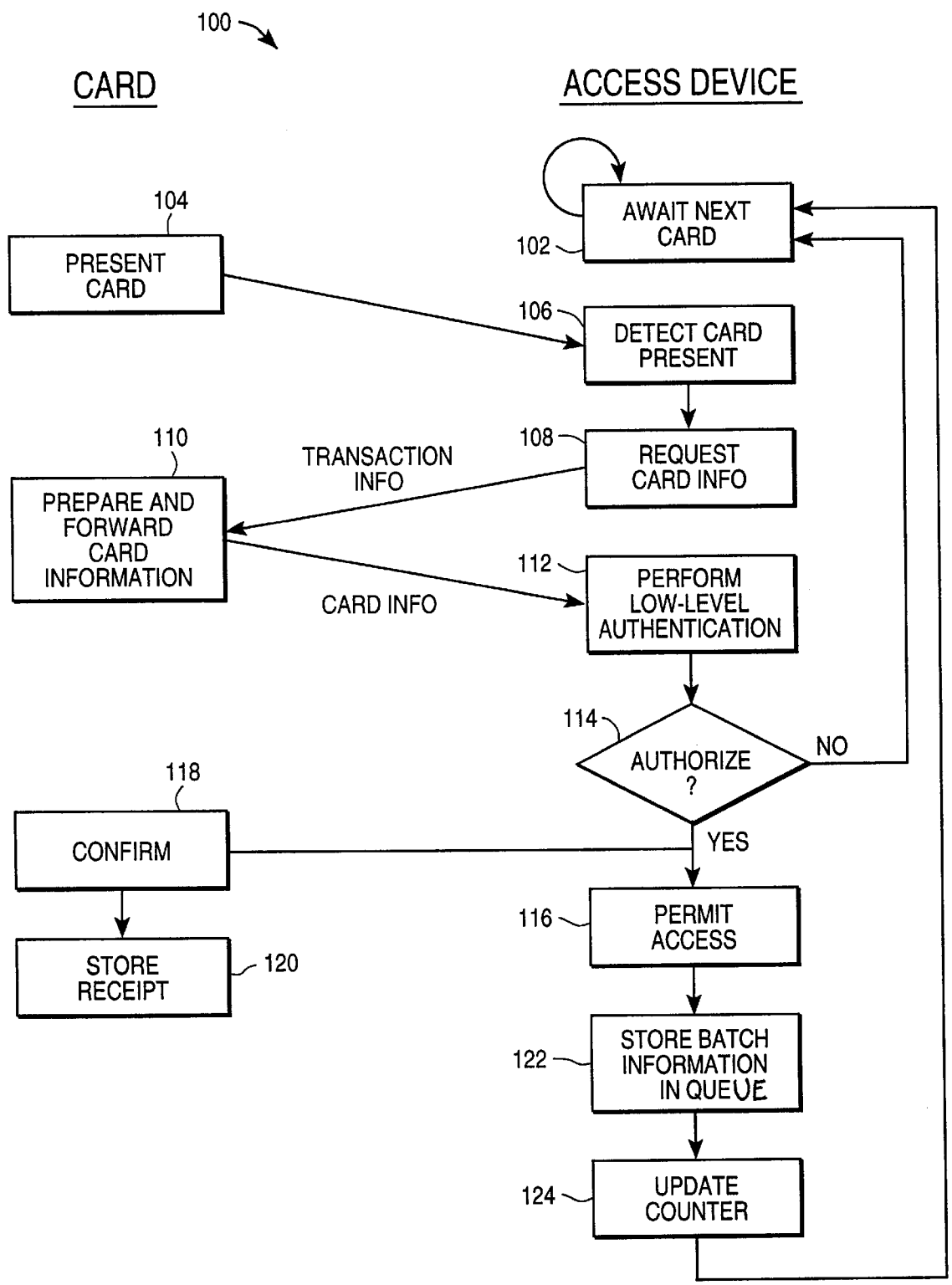
FIG. 3 is a flow diagram depicting a transaction process according to an embodiment of the present invention.

Referring now to FIG. 3, a flow diagram depicting an initial low-level authentication and authorization process 100 involving consumer card 12 and access device 40 is shown. In operation, access device 40 has a wait state 102 where it awaits presentation of the next card. For example, access device 40 may be an admission turnstile at, e.g., a metro rail station, or any of the other access devices discussed herein, or other access devices designed to permit access to goods or services upon confirmation of payment. When a cardholder presents consumer card 12 in step 104, access device 40 detects that a card is present (step 106). Access device application hardware and software 46 and card handler 44 then generate a command or request for card information from the card (step 108). This command or request is presented to the card through interface device 30. The command or request presented to consumer card 12 may include transaction information such as an identification of the value which needs to be transferred (e.g., the amount of the fare to be paid).

Consumer card 12, upon receipt of the request for information, performs manipulations and calculations to prepare and forward the requested card information (step 110). These calculations may include specific calculations dictated by transit application program 15 if present, or may simply involve a determination of whether sufficient funds exist in stored value application program 13. For the purposes of this disclosure, it will be assumed that the calculations will be related solely to verifying whether funds exist in the stored value application; however, those skilled in the art will recognize that other calculations may be performed, such as checking transit attributes in transit application 15, e.g., checking the cardholder's status (senior, student, monthly passholder, etc.) or the like.

In this exemplary embodiment, the card information forwarded back to access device 40 may include information such as: card identification information; card issuer identification information; the value requested by access device 40; the expiration date of the card; and any other information needed to authorize and authenticate the transaction.

This card information is passed to access device 40 through interface device 30. When the card information is received, access device 40, using access device application hardware and software 46, performs a low level authentication (step 112). The type of low level authentication performed is chosen to reduce the amount of time needed to authenticate the transaction. For example, in a currently-preferred embodiment, low level authentication step 112 involves ensuring the card 12 has sufficient value to pay the requested value. Other steps may be included in the low level authentication process while still maintaining a fast response time, such as: checking the card number against a bad card list, performing some velocity or floor limit checking, verifying that transit application program 15 is not expired or incompatible with the requested access, etc.

If low level authentication step 112 produces a satisfactory result, access device application hardware and software 46 will authorize (step 114), e.g., entry or admission of the cardholder. If low level authentication step 112 fails (e.g., the cardholder had insufficient funds to cover the cost of the transaction or had an incompatible currency type, etc.), admission or entry is declined (step 114) and access device 40 may revert to a wait state to await presentation of the next card (step 102), or representation of the declined card.

Where authorization is given, a confirmation signal or message may be sent to consumer card 12 (in step 118) and the card can store a receipt or other proof of transaction (step 120) in card memory. The cardholder is then permitted access or entry. For example, access device hardware and software 46 may generate an access permission signal (step 116) which activates a turnstile or other entry device.

Once access has been granted, access device application hardware and software 46 stores the card information (step 122) received during step 112. The card information received for each transaction is stored in buffer 50. This information is retained in the buffer for subsequent processing to be described. Once access device 40 has stored the transaction information in buffer 50, the device increments an internal counter (NT) (step 124). Access device 40 then reverts to a wait state to await presentation of the next card (step 102).

Access devices or other terminal devices implemented using features of the invention are suited for applications where a large number of cardholders need quick authorization response times. Typically, these applications are low-dollar transactions, such as transit terminals, where users can not be expected to patiently wait for response times in excess of, e.g., 1.0 to 2.0 seconds. From the cardholder's perspective, systems implemented according to the invention process and approve the transaction almost instantly. By reducing the amount of information processing required to perform this access authorization, systems implemented with features of the present invention are capable of authorizing access, transferring value, and storing a confirmation message using stored value cards in approximately less than 0.25 to 0.5 seconds, for example. Systems implemented using features of the invention allow the use of "open" stored value card system applications in transit or access applications, giving cardholders the ability to use a single card for purchases at point of sale devices and transit applications.

Figure 4:
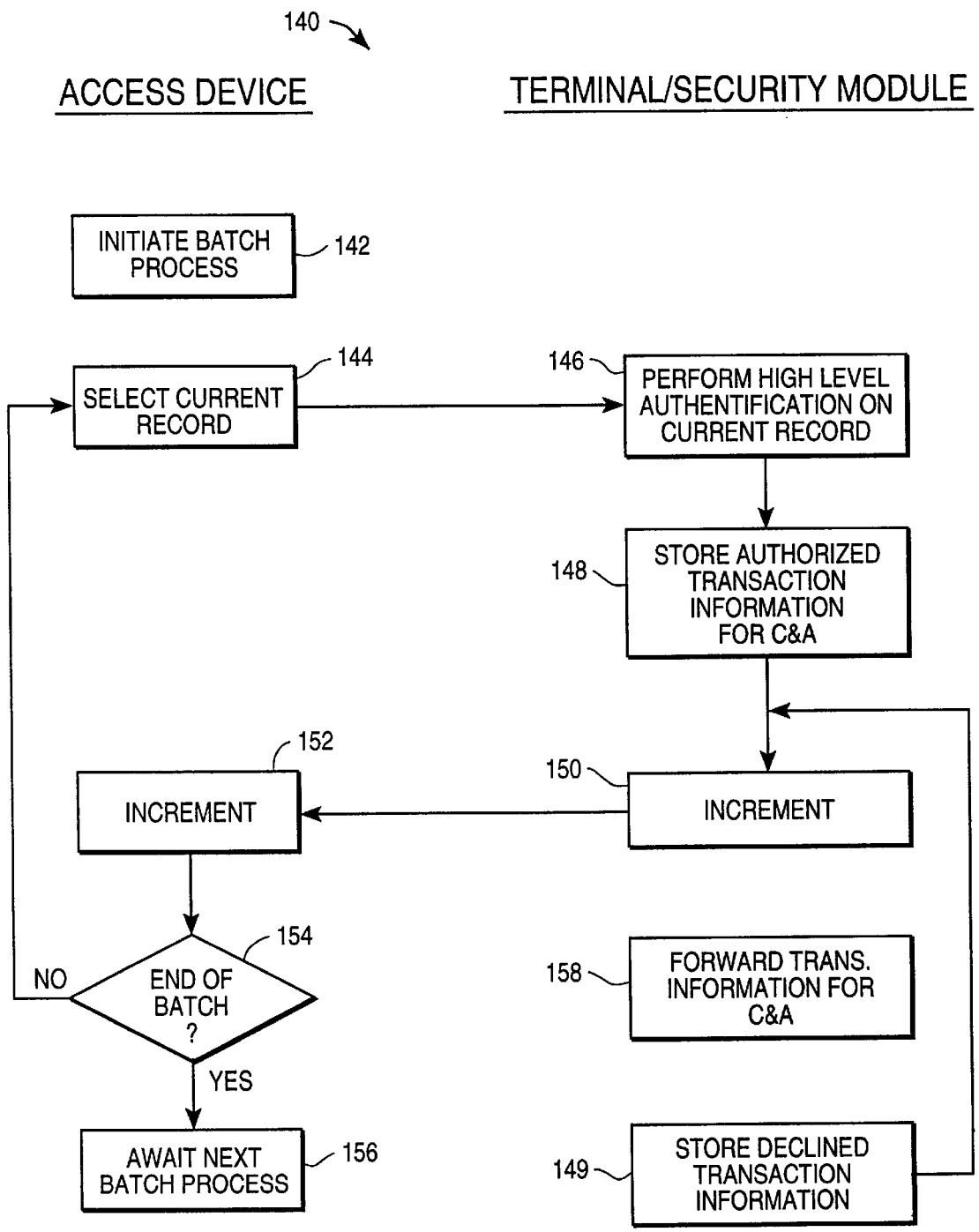
FIG. 4 is a flow diagram depicting a high level authentication process according to an embodiment of the present invention.

At this point in the transaction, although the initial authentication and authorization process 100 is completed and the cardholder has been granted access, the transaction is not yet fully authorized. Referring now to FIG. 4, a flow diagram depicting a subsequent authorization process 140 is shown. Performance of this subsequent authorization process 140 is transparent to cardholders who use the access device, and will typically be performed some time after the cardholder has left the vicinity of the access device (e.g., after the cardholder has been granted access to board or enter a transit system, or after the cardholder has passed through a toll gate, etc.).

The subsequent authorization process commences in step 142, when a batch process is initiated by access device application hardware and software 46. This batch process may be initiated based on, e.g., passage of time (e.g., once every 10 minutes, hour, or day, etc.) or after a certain number of transactions have accumulated in buffer 50 (e.g., once every 100 transactions, etc.). Alternatively, the process is performed whenever there is any information in buffer 50 and terminal 60 has CPU cycles available (i.e., the process is constantly running, but at a lower priority). While FIG. 3 depicts the access device as having control over initiation of the batch process, upon reading this disclosure those skilled in the art will recognize that terminal 60 may instead be responsible for initiating the batch process. For example, terminal 60 may initiate the process after a certain amount of time has elapsed.

Once batch process (step 142) is initiated, access device application hardware and software 46 selects the first record in the buffer as the current record (step 144) (e.g., buffer 50 is a first-in first-out device or FIFO). In a currently-preferred embodiment, the first record to be processed in the batch is the record with the lowest associated counter number. This current record is passed to terminal 60 via terminal interface application 48 and access device interface application 72 for processing. Terminal 60, using security card 64 and security card handler 62, performs a high level authentication on the current record in step 146.

This high level authentication may include, e.g., steps necessary to verify that the card used was a valid card and that the card was validly issued (steps which typically involve the decryption of information). By placing the responsibility for these computationally-intensive (and relatively slow) actions on access device 40 and terminal 60, interaction between card 12 and access device 40 is sped up considerably, without substantial compromise in authentication integrity and security.

The high level authentication process 146 may also include, e.g., steps necessary to generate a signed message for transmission to the stored value system's clearing, authorization and settlement system. This information is stored in data store 66 (step 148). Upon completion of high level authentication for the current record, a transaction counter is incremented in security card 64 (step 150). A counter in access device 40 is similarly incremented (152), and the next transaction in buffer 50 is then processed. Alternatively, the counter in access device 40 may be synchronized with the counter in security card 64 after all transactions in the current batch have been processed. Those skilled in the art, upon reading this disclosure, will recognize that the access device counter should be synchronized with the security card counter at some point before a new batch process is initiated. Alternatively, a synchronized clock or other means may be used to ensure access device 40 and terminal 60 process each transaction appropriately.

Access device 40 checks to determine if any more records exist in the batch (step 154). If more records exist, the next record is selected as the current record (step 144) and steps 146–154 are repeated until the batch is exhausted, at which point access device 40 will await initiation of the next batch process (step 156). Those skilled in the art will recognize that the batch process may alternatively involve passing the entire contents of buffer 50 to terminal data storage 66 at which time terminal 60 can iteratively process the batch without interacting with access device 40. Buffer memory 50 may be partitioned to permit a batch process to be completed in the background while initial authentication process 100 is completed in the foreground, allowing access device 40 to be used by, e.g., transit riders, while the batch is processed.

There may be instances where a card presented to access device 40 passes the low level authentication process of FIG. 3, but which for some reason does not pass the high level authentication process of FIG. 4. In this event, declined or failed transaction information is stored in data store 66 (step 149). This information is passed to clearing and authorization system 90 for subsequent resolution. For example, the cardholder or card issuing bank may be contacted to resolve the discrepancy, or the card information may be added to a bad card list to be stored in each access device 40 of a transit system.

Terminal 60 stores the authorized and failed transaction information in data store 66 and, e.g., at some subsequent time, forwards the information to the stored value system's clearing, authorization and settlement system 90 (step 158). This information may be initially forwarded to, e.g., a concentration point 80 or some other form of intermediary storage location, or may be forwarded directly into clearing, authorization and settlement system 90.

The result is a stored value system suited for applications where cardholders demand a very fast transaction approval and response time and where large numbers of transactions are presented for authorization.

A currently-preferred implementation of a two-level authentication process incorporating features of the present invention will now be described by referring to FIG. 2 in conjunction with FIGS. 5 and 6. In this embodiment, consumer card 12 is a card which carries public key generated certificates. While any of a number of cryptosystems may be used, the following discussion describes an implementation using public key cryptography. This specific embodiment of the present invention employs a known authenticating technique utilizing "digital signatures" which allows a first party to employ a secret key to "sign a message" which the receiving party or a third party can validate using the first party's public key.

Using such digital signatures, it is possible for any digital message to be signed so that the recipient is assured that the message is received as sent, and that it is not a forgery. This is done by using the "public key" and digital signature methodology such as described by at least U.S. Pat. No. 4,405,829, hereinafter referred to as RSA technique. There are other public key and signature techniques which use methodologies other than RSA. Examples of other public key or signature techniques include Fiat-Shamir, Ong-Schnorr-Shamir, and several others derived from zero-knowledge proof techniques. The present invention is not limited to any particular public key or signature technique. These techniques, and others, are described in "Applied Cryptography", by Bruce Schneier, Second Edition 1996, which is incorporated herein by reference for all purposes.

A user who has a public/private key pair can digitally sign a message by "encrypting" (or "signing") the message or a hash of it with the user's private key before transmitting the message. Recipients of the message can verify the message or signature by decrypting it with the sender's public encryption key. Anyone who has the user's public encryption key can read the message or signature, but only the sender having the secret decryption could have created the message or signature. In general, the digital signature assures the recipient of the integrity of the message at the time the signature was computed. Again, the use of these public key techniques is not necessary for implementation of systems according to the present invention, and are merely described herein as a currently-preferred embodiment.

In an exemplary embodiment to be described in conjunction with FIGS. 2, 5, and 6, consumer card 12 stores the information shown below in Table 1.

TABLE 1

| DATA ITEM | DESCRIPTION |
|---|---|
| ICERT | Card Issuer's Public Key certificate |
| CCERT | Card Public Key certificate |
| BIN | Card Issuer identification number |
| ID | Card serial number |
| ALGCA | Algorithm used for purchase |
| DEXP | Expiration date of card |
| BAL | Balance of the card purse |
| CURR | Currency of the card purse |
| CEXP | Currency exponent of the purse |
| AM | Authentication mode |
| NT | Transaction number |
| VPKI | Certificate authority public key number |
| CSKEY | Card secret key |

Some of this information is stored in the card when the card is personalized (e.g., the BIN, ID, ALGCA, DEXP, CURR, CEXP, AM, VPKI, CKEY, CCERT, and ICERT). Other information regarding the card balance (BAL) and the counter or transaction number (NT) are updated as the card is used.

A public key certificate hierarchy is used in this specific embodiment. As an exemplary hierarchy, a first public key pair (CAPK, CASK) is generated for a certificate authority (CA). A second public key pair (IPK, ISK) is generated for the card issuing bank. And a third public key pair (CPK, CSK) is generated for each card 12. The issuing bank sends their public key pair (IPK, ISK) to the certificate authority (CA) which generates an issuer certificate (ICERT) using CASK. ICERT is sent to the issuing bank. All cards issued by the issuing bank are personalized with this issuer certificate (ICERT) as provable evidence that the card is issued by a valid issuer. Also during personalization, the issuing bank generates a card certificate (CCERT) using the card public key pair (CPK, CSK) and the issuing bank's secret key (CASK). This serves as provable evidence that the card is a valid card. CCERT and ICERT are stored in consumer card 12 (see Table 1, above).

In this particular exemplary embodiment, the card certificate (CCERT) is formed using RSA encryption techniques and includes information uniquely identifying the card, such as: information identifying the card and the issuer of the card (e.g., ID and BIN); information regarding the formation and expiration of the certificate; and information regarding the algorithm used to generate the certificate. The card certificate may be formed and stored on the card when the card is personalized, and may be generated using public key encryption techniques. The card certificate (CCERT) also contains a hash (using, e.g., the Secure Hash Algorithm SHA, set forth in the Digital Signature Standard NIST FIPS PUB 186, U.S. Department of Commerce, May 1994) of the card's public key CPK.

The issuers certificate (ICERT) may also be formed using RSA techniques and include information identifying the card issuer, information identifying the certificate (e.g., expiration date, etc.), and information regarding the algorithm used to generate the card certificate (CCERT). ICERT may also contain a hash of the issuer's public key IPK.

In this manner, a party having the certificate authority (CA) public key (CAPK) and the issuer's certificate (ICERT) can recover the issuer's public key (IPK), while a party having the issuer's public key (IPK) and the card's certificate (CCERT) can recover the card's public key (CPK).

Figure 5:
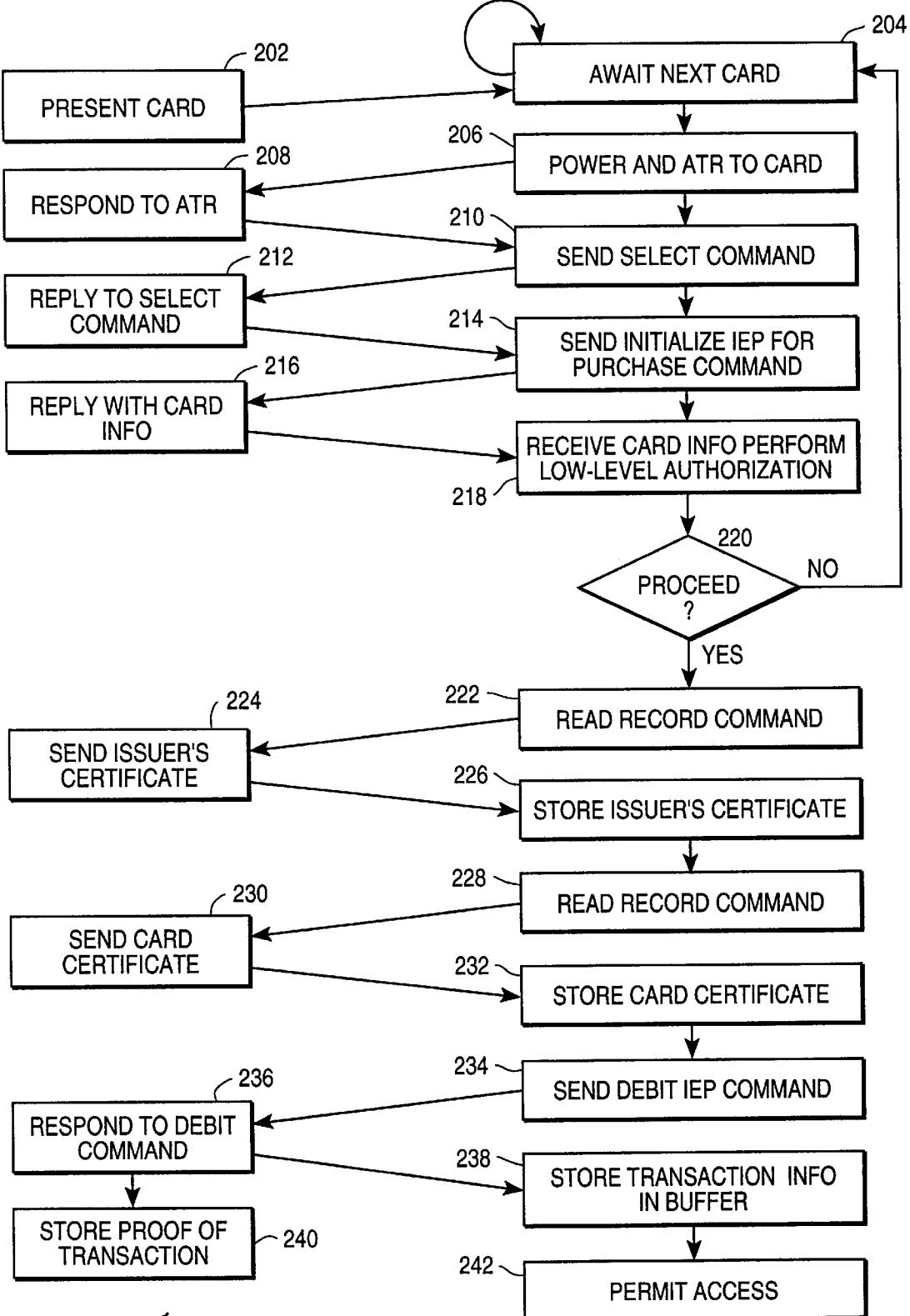
FIG. 5 is a flow diagram depicting a transaction process according to a further embodiment of the present invention.

Referring now to FIG. 5, one specific implementation of a low-level authentication process 200 according to the invention is shown. Access device 40 loops in a wait state 204 for the next card to be presented for access authorization. Consumer card 12 is presented to an interface device 30 of access device 40 in step 202. Access device 40 provides power and performs initial protocol setup (e.g., generates an ATR sequence as described in ISO/IEC Standard 10536, etc.) to establish contact with card 12 (step 206). Card 12 responds to this initial sequence (208).

Access device 40, upon verifying that card 12 is a compatible card, proceeds to send a SELECT command to the card (step 210) to select stored value application program 13 as the application to be used for this particular transaction. In response to the SELECT command, card 12 replies (step 212) with information regarding stored value application program 13. Those skilled in the art will recognize that this SELECT command and response may vary from system to system, and is provided here only as an example.

At this point, access device 40 sends an INITIALIZE IEP FOR PURCHASE command to card 12 (step 214). Card 12, in response, first increments a transaction counter (NT), and then forwards information regarding the card, including, for example: BIN, ID, ALGCA, DEXP, BAL, CURR, CEXP, AM, NT, and VPKI. At this point, access device 40 may perform a low-level authentication (step 218) to determine if the transaction can proceed. For example, this low-level authentication may include verifying that the currency type (CURR) is supported (e.g., if the access device requires U.S. Dollars, the value of CURR must indicate the card holds value in U.S. Dollars). Low-level authentication step 218 may also include verifying that the card balance BAL is greater than or equal to the cost of the purchase (e.g., the cost of the fare purchased). Alternatively, access device 40 can rely on card 12 performing the verification of funds availability and compatible currency, and access device 40 may simply (or additionally) verify that card 12 has not yet expired (i.e., check card expiration date CEXP). Whatever the authentication steps chosen for performance by access device 40, they should be capable of performance quickly, and preferably without the need for computationally-intensive cryptography.

Access device 40 checks to see if the required conditions are satisfied (step 220). If low-level authentication is not satisfied, access device 40 terminates the transaction and reverts to wait state 204 without further processing.

If low-level authentication is satisfied, access device 40 proceeds to issue a READ RECORD command (step 222). In response to this first READ RECORD command, card 12 responds by sending issuer's certificate (ICERT) (step 224). This certificate is stored in access device 40 (step 226). Access device 40 then issues a second READ RECORD command (step 228), in response to which card 12 sends card certificate (CCERT) (step 230) to access device. Access device 40 stores this certificate (step 232) and issues a DEBIT IEP command to the card (step 234). This DEBIT IEP command is passed to card 12 along with information regarding the purchase amount (M). Information regarding the type of currency, the currency exponent, and the terminal identifier and location may also be passed with this command. In addition, information to ensure the transaction message generated by the card is unique may also be passed, including: time, date, and the current value of the access device's transaction counter (NT).

Card 12 responds to this DEBIT IEP command (step 236) by first performing several internal calculations, including verifying that sufficient value is available to make the purchase. The amount of the purchase (M) is decremented from the card balance (BAL) and a record of the transaction is stored in non-volatile memory of the card (step 240). In addition, card 12 generates a signature of the transaction (SP) for transmission to access device 40. This signature (SP) is generated using the card's secret key (CSK) and includes, for example, information which may be used to prove the fact of the transaction, such as: the amount debited; the new balance of the card; the card's expiration date; the currency code; the currency exponent; the card's transaction number; the access device's transaction number; access device identifying information (including information regarding the security card 64 associated with the particular access device); etc. This signature (SP) may also be stored in non-volatile memory of card 12 (step 240).

Access device 40 receives and stores this information (step 238) in buffer 50. Access device 40 then permits cardholder access (step 242) to the goods or services purchased (e.g., entry to a transit system may be permitted by activating a turnstile), or provides confirmation to a system operator that the transaction has completed low-level authentication (e.g., a visual signal may be presented to a bus driver, etc.)

This low-level authentication process 200 may be completed in a very quick manner (e.g., on the order of 0.25–0.5 seconds from the time the card is presented to the interface device until the time of access permission), while providing a relatively sure means of authenticating the existence of funds to pay for the transaction. The access device 40 now has sufficient information stored in buffer 50 to complete a full, or high-level authentication of the card and funds.

Figure 6:
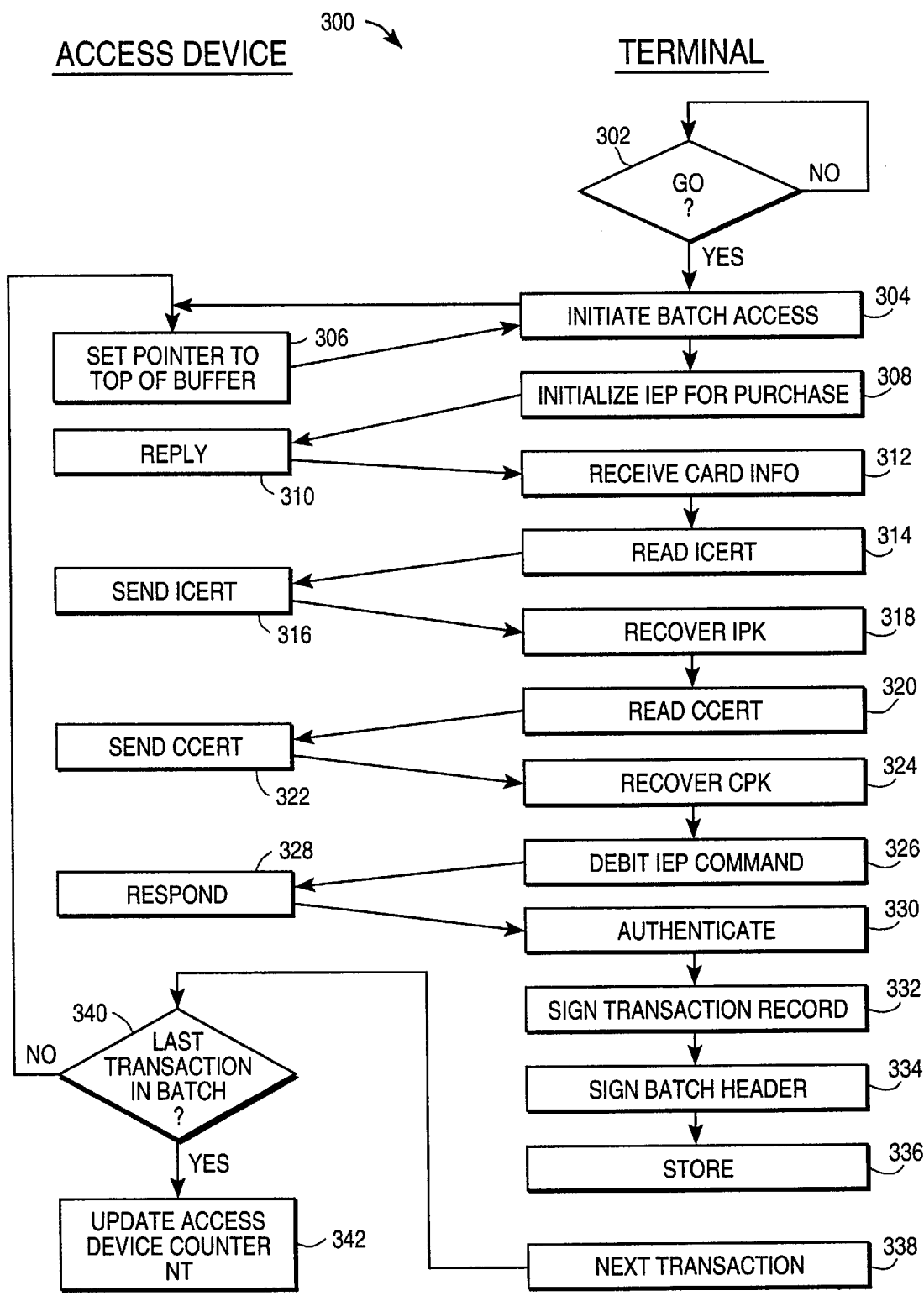
FIG. 6 is a flow diagram depicting a high level authentication process according to a further embodiment of the present invention.

Referring now to FIG. 6, a high-level authentication process 300 according to one specific embodiment of the present invention is shown. This authentication process takes place between access device 40 and terminal 60 independent from the interaction between access device 40 and consumer cards. In the specific embodiment shown, terminal 60 is shown as assuming the responsibility to contact access device 40 to initiate a batch high-level authentication process 300.

In step 302, terminal 60 determines whether it is time to initiate a batch process (step 304). This determination may be made based on the lapse of time or some other factor. When a batch process is initiated, access device 40 is notified and sets a pointer to the top transaction record stored in buffer 50 (step 306), and provides some indication to terminal 60 that it is ready for batch processing. Terminal 60 then proceeds to sequentially perform high-level authentication and processing for each transaction record stored in buffer 50.

Terminal (or, more particularly, security card 64) controls the high-level authentication and processing for each transaction record. This process begins in step 308 when security card 64 generates an INITIALIZE IEP FOR PURCHASE command which is passed to access device 40. The access device, under control of terminal interface application 48, responds with card information (step 310 and 312) from the first transaction record, including information such as: BIN, ID, ALGCA, DEXP, BAL, CURR, CEXP, AM, NT, and VPKI (information which was sent from consumer card 12 in response to the INITIALIZE IEP FOR PURCHASE command described in conjunction with FIG. 5, above).

Security card 64 then issues a READ command (step 314), prompting access device 40 to send the issuer's certificate ICERT from the current transaction record (step 316). Security card 64, using a Certification Authority public key (CAPK) stored in security card memory, recovers the issuer's public key (IPK) from the issuer's certificate (ICERT). If this recovery cannot be performed, the transaction fails high-level authentication, as the consumer card used to perform the purchase transaction was not validly issued.

If ICERT is successfully recovered, security card 64 generates another READ command (step 320), prompting access device 40 to reply with the card certificate (CCERT) in step 322. Security card 64 recovers the card public key (CPK) (step 324) using the issuer's public key (IPK) recovered in step 318. If the card public key cannot be successfully recovered, the high-level authentication process fails.

If the card public key (CPK) has been successfully recovered, the authentication process continues to step 326, where security card 64 issues a DEBIT IEP command. This DEBIT IEP command is passed to access device 40 along with information regarding an identification of the security card 64. In addition, information to ensure the transaction message generated by the card is unique may also be passed, including: time, date, and the current value of transaction counter (NT) of security card 64.

Access device 40 responds to this DEBIT IEP command (step 328) by forwarding the signature of the transaction (SP) generated by consumer card 12. Security card 64 performs the necessary cryptographic steps needed to authenticate the signature of the transaction (330). If this authentication is successful, the transaction from the current record in buffer 50 of access device 40 has been successfully high-level authenticated, and the paid party (e.g., a transit system) will be guaranteed payment of funds equal to the transaction amount, while the account of the paying party (i.e., the holder of consumer card 12) will be decremented in an amount equal to the transaction amount.

Security card 64 may then sign the transaction record (step 332) using, e.g., a message authentication code (MAC) or the like. Additionally, security card 64 may sign a batch header (step 334) and store the record (step 336) for subsequent forwarding to, e.g., concentration point 80 as described above in conjunction with FIG. 2 and FIG. 4.

Terminal 60 then requests the next transaction from access device 40. If the transaction was not the last transaction in buffer 50 (step 340), access device increments counter NT and retrieves the next record. Steps 306–342 are then repeated until all records in buffer 50 have been subject to high-level authentication.

Embodiments of the present invention, thus, permit a stored value system which uses public key techniques to be used in conjunction with transit applications or other applications which demand fast authorization response times.

While the above is a complete description of the preferred embodiments of the invention, various alternatives, modifications, and equivalents may be used. For example, while public key encryption techniques were described, symmetric or other techniques may also be used. Further, while specific functional responsibilities were allocated to the access device or terminal, such as initiation of the batch process, the allocations may be reversed in some instances while still producing the two-level authentication of the invention.

Therefore, the above description should not be taken as limiting the scope of the invention which is defined by the appended claims.

What is claimed is:

1. A method for using a smart card to gain access through an access device upon payment of a value (V), the method comprising the steps of:

operatively coupling said smart card to said access device;

reading at least a first set of data and a second set of data from said smart card;

performing a first authentication process on said at least first set of data;

permitting access if said step of performing a first authentication process meets a required condition;

storing said at least first set of data and said second set of data in a memory of said access device; and performing a second authentication process on said at least first set of data and said second set of data after said step of permitting access is accomplished.

2. The method of claim 1, wherein said first set of data includes information indicating a balance (B) of funds available in said smart card, and an expiration date (DEXP) of said smart card.

3. The method of claim 1, wherein said second set of data includes a card public key certificate, a card issuer public key certificate, and a signature generated by said smart card.

4. The method of claim 2, wherein said first authentication process includes the step of verifying that said balance (B) is greater than said value (V).

5. The method of claim 2, wherein said first authentication process includes the step of verifying that said expiration date (DEXP) has not passed.

6. The method of claim 2, wherein said required condition is said balance (B) being greater than said value (V).

7. The method of claim 3, wherein said second authentication process includes the steps of verifying said card certificate, verifying said issuer certificate, and verifying said card signature.

8. The method of claim 1, wherein said second authentication process is performed between a terminal device and said access device.

9. The method of claim 8, wherein said terminal device includes a security card.

10. An access system, including:

an interface device, having contacts for coupling with a smart card to read at least a first and a second set of information;

an access device, coupled to said interface device, having at least a first processor for performing a low-level authentication of said at least first set of information received from said smart card;

a memory in said access device, storing said at least first set of information and said second set of information;

a gate device, coupled to said access device, said gate device granting access to a cardholder after said low-level authentication is performed; and at least a first security module, said first security module being in communication with said access device, wherein said first security module is arranged to perform a high-level authentication of said at least first set of information and said second set of information received from said card after said at least first set of information received from said card and stored in said memory.

11. The access system of claim 10, wherein said gate device is a turnstile.

12. The access system of claim 10, wherein said first set of information includes at least a balance (B).

13. The access system of claim 12, wherein said low-level authentication includes verifying that said balance (B) is greater than a cost of access.

14. The access system of claim 10, further comprising:

a terminal device, coupled to said access device, said terminal device having said at least first security module for performing said high-level authorization of said at least first set of information and said second set of information received from said card and stored in said memory, said high-level authorization including at least one selected from the group consisting of verifying validity of said card and generating a signed message.

15. The access system of claim 14, further comprising:

a concentration point, coupled to said terminal device, for receiving information regarding said high-level authorization.

16. An access control system, comprising:

a plurality of card reading devices, each having a contact structure for reading at least first data and second data from a smart card;

a plurality of access devices, coupled to said card reading devices, for performing a low-level authentication on said at least first data from said smart card, said access devices having a memory for storing said at least first data and said second data from said smart card; and a terminal device, coupled to said plurality of access devices, for performing a high-level authentication on said at least first data and said second data from said smart card after said at least first data and said second data are stored in said memory of said access devices.

17. The access control system of claim 16, wherein said terminal device includes a plurality of security cards, each security card for use in performing a high-level authorization of said at least first data and said second data from a specific one of said plurality of access devices.

18. The method of claim 1, wherein said second authentication process is performed on said at least first set of data and said second set of data after said at least first set of data and said second set of data are stored in said memory of said access device.

19. The method of claim 1, wherein said first authentication process is a low-level authentication process that includes ensuring that said smart card has sufficient value to permit access.

20. The method of claim 19, wherein said second authentication process is a high-level authentication process that includes generating a signed message that is suitable for transmission from said access device.

* * * * *